April 24, 1956     G. W. CLEVENGER     2,743,222
ELECTROLYTIC PROCESS FOR RECOVERING URANIUM
COMPOUNDS FROM CARBONATE LEACH LIQUORS
Filed Feb. 16, 1953
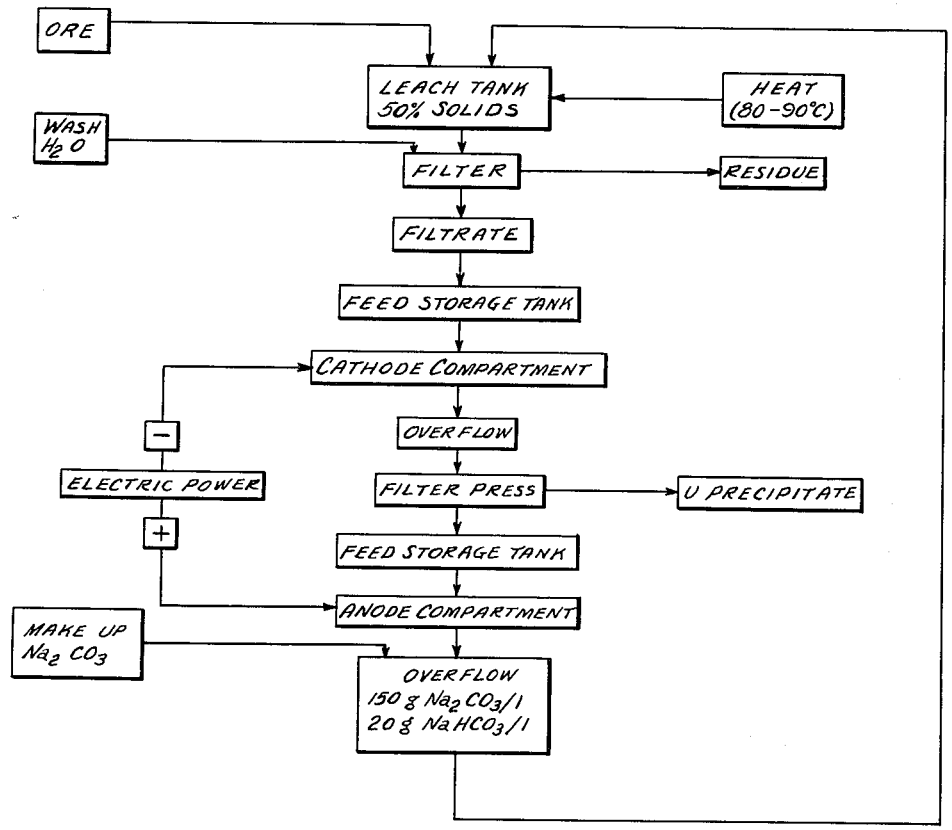
INVENTOR
GALEN W. CLEVENGER
BY
ATTORNEY

2,743,222

ELECTROLYTIC PROCESS FOR RECOVERING URANIUM COMPOUNDS FROM CARBONATE LEACH LIQUORS

Galen W. Clevenger, Newtonville, Mass., assignor, by mesne assignments, to the United States of America as represented by the United States Atomic Energy Commission Application February 16, 1953, Serial No. 336,922

5 Claims. (Cl. 204—86)

This invention relates to an improved process of recovering uranium compounds from ores containing them and more particularly to an improved process of recovering uranium from alkaline leach solutions such as sodium carbonate leach solution.

One of the well known methods of recovering uranium compounds from ores involves a sodium carbonate leach. This produces a leach liquor which, after separation from the barren residue, has to be subjected to procedures which result in the recovery of uranium therefrom. Usually this is effected by a change in the pH of the leach liquor, for example, by adding caustic soda or other strong alkali so that the soluble complex compound of uranium oxide and sodium carbonate is decomposed and uranium compounds of relatively low solubilities produced which can be recovered by filtration. One of the principal cost factors in this recovery step is involved in the caustic alkali which is used to effect the decomposition of the soluble uranium complex. The cost is increased by the fact that uranium mines are rarely close to cheap sources of caustic alkali and transportation is therefore an important factor. A further disadvantage lies in the fact that the addition of caustic alkali results in a pH of the solution which is too high for leaching purposes. As a result the filtrate from the uranium recovery step cannot be reused for leaching further quantities of ore without chemical treatment such as the addition of carbon dioxide or sodium bicarbonate with a resultant further increase in cost. Even when the filtrate from the uranium recovery step is subjected to chemical treatment there is further disadvantage that the addition of the caustic alkali, in order to change pH, results in building up salts which makes it necessary to discard a portion of the solution from time to time when the concentration of sodium compounds becomes too high for best leaching composition.

The present invention avoids the above disadvantages and results in a simple and economical process. According to the present invention an electrolytic cell is used having cathode and anode compartments separated by a conventional porous membrame of suitable alkali resistant material. The electric current decomposes sodium carbonate into sodium hydroxide in the cathode compartment and sodium bicarbonate in the anode compartment. Leach liquor from the sodium carbonate leaching of uranium ore is fed into the cathode compartment resulting in a continuous overflow of material therefrom. The sodium hydroxide produced by the electrolysis raises the pH of the catholyte to the point at which the soluble uranium complex is decomposed and the less soluble uranium compound produced, which may be sodium uranate, precipitates partially. Suitable agitation is provided so that the precipitated solids overflow with the liquid from the cathode compartment or are otherwise removed. The rate of feed and rate of electrolysis are adjusted to maintain the pH at the desired point. The suspension of solids leaving the cathode compartment is filtered producing a precipitate of uranium compound and a filtrate of relatively high pH which carries in it some dissolved uranium compound.

The filtrate from the uranium recovery is then introduced into the anode compartment resulting in an overflow of liquid in which the sodium bicarbonate of the anolyte reduces the high pH and regenerates a sodium carbonate solution of suitable pH for the leaching of further quantities of uranium ore. This leach solution which contains the unprecipitated uranium is reused after the addition of a small amount of makeup sodium carbonate which replaces the sodium removed in the precipitate of the uranium compound and also the sodium carbonate which is consumed in leaching the ore by reaction with constituents of the ore other than uranium.

It is advantageous to operate process of the present invention continuously and to recirculate continuously the filtrate from the uranium precipitation to the anode compartment at a rate suitable to permit neutralization and produce a continuous overflow. It is of course perfectly feasible to remove anolyte from the anode compartment and mix it with the filtrate but as this involves an additional step and additional equipment it is ordinarily not preferred. The continuous operation is also advantageous from the standpoint of utilization of electric power.

There are marked savings of sodium carbonate because in order to effect sufficiently complete leaching of uranium from the ore a very large excess of sodium carbonate is necessary over that which actually reacts with uranium compounds to form a complex. It is this large excess which is recovered in the regenerating steps of the present invention.

The electric power used is determined by the amount of electrolysis which is necessary to effect the desired increase in pH. This amount of power does not materially change with the richness of the leach liquor in uranium. Thus the present process is more efficient in terms of a power consumption per pound of uranium recovered when used with richer uranium ores or with processes in which the leach liquor is concentrated. It is however an important practical advantage of the present invention that even with quite lean uranium ores the power consumption is sufficiently low to effect a marked saving over the cost of chemical regeneration. In general, the power consumption will vary from 10 kwh. or less per pound of uranium oxide recovered in the case of rich leach liquors up to about 20 kwh. per pound with very lean leach liquors.

It is an advantage of the present process that the uranium content of the regenerated leach liquor is recovered almost completely so that the overall recovery is not reduced by the fact that in any particular precipitation a certain amount of the uranium is recirculated. However, this desired effect can only be obtained by observing the customary precautions in continuous leach processes, such as adequate washing of the residues. In this respect the present process does not depart from good leaching practice. Even with ores of only moderate uranium content it has been possible to contain uranium recoveries of about 97%. As a result the marked operation economies of the present invention are obtained without any loss of valuable material.

Another important practical advantage of the present invention lies in its utilization with ores where it is desirable to have a certain amount of sodium bicarbonate in the leach liquor as substantially all of the sodium transformed into sodium hydroxide by the electrolysis is balanced by a corresponding sodium bicarbonate formation. It is extremely simple to operate the present process to give a regenerated leach liquor of any desired sodium bicarbonate content. It is thus possible to supply continuously, leach liquor of optimum composition for any particular ore. The regeneration of the leach liquor by the process of the present invention does not introduce additional unwanted salts and produces a leach liquor of optimum composition for reuse.

The sodium carbonate leaching process particularly when used with ores which contain carnotite or other minerals including vanadium result in the leaching of considerable amounts of vanadium and of course small amounts of other ore constituents may also be removed. I have found that no problem is raised by building up other constituents in the leach liquor. Continuous operation for months show no change in operating efficiency, specific gravity or other characteristics of the solution which would indicate buildup. It is not known why accumulation of undesired constituents in the leach liquor does not occur and it is not desired to limit the present invention to any theory of why there is no interference from accumulation of other constituents. The fact that accumulation does not take place and that therefore purging of a portion of the leach liquor at frequent intervals is unnecessary is an important practical operating advantage of the present invention.

As has been pointed out above the sodium which is removed as a precipitate with the uranium has a corresponding sodium bicarbonate formation in the anolyte. While it is desirable with some ores to have some bicarbonate content in the leach liquor there are limits to the optimum bicarbonate content and in some cases the amount of sodium removed with the uranium may produce more bicarbonate than is desirable. It may be necessary in certain cases therefore to add a certain amount of sodium hydroxide as well as sodium carbonate for makeup purposes. This sodium hydroxide can be produced from cheaper sodium compounds in the electrolytic cell or where the economics favor it, it may be added to the regenerated liquor in a preformed state. In this respect the present invention is quite flexible and the best operating compromise will be dictated in each case by the economic and technical considerations involved.

Certain ores require, for best leaching, the presence of a certain amount of a suitable oxidizing agent in the sodium carbonate leach liquor. In the case of such ores the present process has an additional advantage. It is in the nature of an electrolytic process to produce oxidizing conditions in the anode compartment and it is possible to utilize the oxidizing conditions to produce or to regenerate oxidizing agents where they are required in the leaching. This additional advantage of the present invention adds to its field of utility.

The description of the present invention above has referred to the leaching of ores. It should be understood, of course, that the sodium carbonate leaching processes for uranium recovery are not limited to leaching virgin ore. They may also be used to treat products obtained by other mineral dressing of metallurgical processes thus, for example, there are certain tailings which are obtained from other processes of mineral dressing and which have a uranium content sufficient in amount and of suitable form for sodium carbonate leaching. The present process of course is equally applicable to the leaching of products which have been obtained by treatment of the original ore.

The invention will be described in greater detail in conjunction with a following specific example in which the parts are by weight unless otherwise specified and in connection with a drawing which shows in diagrammatic form a typical flowsheet for the treatment of a uranium bearing ore.

EXAMPLE 1

Referring to the drawing it will be noted that the ore, suitably comminuted, and the leach liquor is introduced into a leach tank which may be a conventional design. The sodium carbonate leaching process is preferably effected at higher temperatures such as 90° C. and so heat is applied either to the leaching equipment itself or to the leach liquor introduced. It is desirable to have the leaching equipment open to the atmosphere so as to permit some evaporation during the leaching as this evaporation will normally effect sufficient concentration to take care of the dilution resulting from the washing of the residues and precipitates which will be described below. The leaching may either be continuous or intermittent provided that a continuous feed is available for the portion of the process carried out in the electrolytic cell.

The materials from the leaching tank are filtered and the residue washed. The filtrate containing washings is continuously introduced into the cathode compartment of an electrolytic cell or rather the cathode compartments of a series of cells connected in parallel as far as solution flow is concerned. The rate of feed and current are adjusted to produce in the cathode compartment a pH corresponding to between 5 and 10 grams per liter of NaOH. With this concentration of NaOH the soluble uranium complex in the leach liquor is decomposed and transformed into uranium compounds with relatively low solubility and the precipitation of the uranium compound results in a slurry which is maintained by suitable agitation to prevent sedimentation of the solids in the cathode compartment. The maintenance of suspension is necessary in the overflow type of electrolytic cell referred to. The cell itself is operated in a normal manner using a suitable alkali resistant membrane which may for example be a fabric of polyacrylonitrile fibers. Electrolytic action produces sodium bicarbonate in the anode compartment of the cell, the bicarbonate production being stoichiometrically equal to the sodium hydroxide production.

The suspension from the cathode compartment is filtered and the precipitate washed with water. The majority of the uranium is recovered in the form of a precipitate. However, there is some uranium still in solution in the filtrate. In typical operation the proportion of uranium reporting in the precipitate is somewhat more than ⅔ of the cell feed, leaving a little less than ⅓ of the uranium in the filtrate which constitutes a circulating load. The filtrate, together with washings, is continuously introduced into the anode compartment at a rate such that regeneration of the sodium carbonate content takes place. After enrichment with makeup sodium carbonate, the overflowing anolyte which may contain about 150 grams per liter of sodium carbonate with about 20 grams per liter of sodium bicarbonate is reused in the leaching apparatus.

The result of a continuous test on an ore containing uranium and vanadium from the Lukachukai district in Arizona is summarized in Table I below which represents averages of samples taken during the operation at the various points in the process.

EXAMPLE 2

The procedure of Example 1 was repeated using a high lime carnotite ore from the Grants ore of New Mexico. The ore contains approximately 90% of calcite, the uranium amounting to 0.46% and is present predominately in the form of the minerals carnotite and uranophane, the latter mineral being difficult to leach with sodium carbonate and requiring the presence of a certain amount of bicarbonate in the leaching solution. A process was operated continuously with pre-use of the regenerated leach liquor through 90 days resulting in approximately 30 cycles of reuse. Results remain uniform throughout the period and particularly there was no falling off in the extraction of uranium in the leaching step. (Table II, column 5.)

*Table I*

LEACHING

| | | |
|---|---|---|
| Solution to leach | parts | 176 |
| $Na_2CO_3$ assay | g./l. | 143 |
| $NaHCO_3$ assay | g./l. | 23.8 |
| Weight of ore leached | parts | 140 |
| $U_3O_8$ assay | percent | 0.3 |
| $V_2O_5$ assay | percent | 0.9 |

Na₂CO₃ Used:
- Net total _____ parts__ 1.53
- Lb. per ton of ore _____ lb__ 22
- Lb. per lb. U₃O₈ recovered _____ lb__ 4.3

NaOH Used:
- Net total _____ part__ .31
- Lb. per ton of ore _____ lb__ 4.4
- Lb. per lb. U₃O₈ recovered _____ lb__ 0.9

Leaching time _____ hours__ 4
Leaching temp _____ °C__ 80–90
Wash H₂O _____ parts__ 70
Weight of residue produced _____ parts__ 136.27
U₃O₈ assay _____ 0.007

ELECTROLYZING

Feed to cell _____ parts__ 182
  U₃O₈ assay _____ g./l.¹__ 4.6
Overflow _____ parts__ 176
  U₃O₈ assay _____ g./l.¹__ 2.0
U₃O₈ depletion _____ g./l.__ 2.3
Average amps _____ 1.5
Average volts _____ 5.5
Weight of precipitate produced ____ parts__ 0.53
Precipitate assay percent U₃O₈ ___ percent__ 68.7
Kilowatt hours per lb. of ppt _____ 10
Kilowatt hours per lb. of U₃O₈ _____ 15

¹ Determined by visual fluorescence comparison. Depletion not calculated from these but from actual weight of U₃O₈ in precipitate.

The following table represents averages of samples taken during the operation at various points in the process.

*Table II*

LEACHING

Solution to leach _____ parts__ 100
  Na₂CO₃ assay _____ g./l.__ 181
  NaHCO₃ assay _____ g./l.__ 20.7
Weight of ore leached _____ parts__ 90
  U₃O₈ assay _____ percent__ 0.46
  V₂O₅ assay _____ ____
Na₂CO₃ used:
  Net total _____ parts__ 1.75
  Lb. per ton of ore _____ lb__ 39
  Lb. per lb. U₃O₈ recovered _____ lb__ 5.0
NaOH used:
  Net total _____ ____
  Lb. per ton of ore _____ ____
  Lb. per lb. U₃O₈ recovered _____ ____
Leaching time _____ hours__ 6
Leach temp _____ °C__ 90–100
Wash H₂O _____ parts__ 41.6
Weight of residue produced _____ parts__ 89.2
  U₃O₈ assay _____ 0.04

ELECTROLYZING

Feed to cell _____ parts__ 108.2
  U₃O₈ assay _____ g./l.¹__ 6.0
Overflow _____ parts__ 100.1
  U₃O₈ assay _____ g./l.¹__ 2.5
U₃O₈ depletion _____ g./l.__ 3.5
Average amps _____ 1.7
Average volts _____ 5.3
Weight of precipitate produced ____ parts__ 0.47
Precipitate assay percent U₃O₈ ___ percent__ 74.7
Kilowatt hours per lb. of ppt _____ 6.7
Kilowatt hours per lb. of U₃O₈ _____ 9.0

¹ Determined by visual fluorescence comparison. Depletion not calculated from these but from actual weight of U₃O₈ in precipitate.

The flowsheet described in the specific examples is one in which the precipitated uranium is separated in a separate piece of apparatus as this brings out most clearly the sequence of steps in the process. It should be understood that the present invention is not limited to the use of any particular apparatus and in fact in large scale commercial operation the process can advantageously be carried out in a new type of electrolytic cell in which the precipitation and removal of the precipitate is effected in a catholyte chamber extension and the recombination of catholyte liquid and anolyte is effected in the cell itself.

As has been pointed out the process of the present invention is applicable both to virgin ores and to products obtained by mineral dressing of ores. In the claims for the sake of clarity the term "ore" will be used to cover not only virgin ore as mined but also the products obtained by beneficiating said ore and tailings from such beneficiation processes. It should be understood that the term "ore" in the claims is used in this broader sense and is not to be interpreted as meaning materials which are in the same state as when they are mined.

I claim:

1. A process of recovering uranium compounds from the leach liquor from the sodium carbonate leaching of uranium containing ores which comprises introducing said liquor into the cathode compartment of an electrolytic cell, the electrolysis rate of the cell and the introduction rate being adjusted to produce a pH in the cathode compartment sufficiently high to decompose the soluble uranium complex in the leach liquor whereby precipitation, as a sodium uranate, of a portion of the uranium results and recovering said precipitated sodium uranate.

2. A process of recovering uranium compounds from the leach liquor from the sodium carbonate leaching of uranium containing ores which comprises introducing the leach liquor into the cathode compartment of an electrolytic cell, whereby the electrolysis in the cell produces sodium hydroxide in the cathode compartment and sodium bicarbonate in the anode compartment, the rate of electrolysis in the cell and the feed to the cathode compartment being adjusted to produce a pH in the cathode compartment sufficiently high to decompose the soluble uranium complex and cause precipitation, as a sodium uranate, of a portion of the uranium content of the leach liquor, separating the precipitated sodium uranate from a mother liquor containing a portion of the uranium in solution and mixing said mother liquor with the anolyte of the electrolytic cell at a rate to regenerate sodium carbonate.

3. A process of recovering uranium from uranium bearing ores which comprises subjecting the ore to leaching with a sodium carbonate leach liquor having a predetermined sodium bicarbonate content, whereby uranium is leached from the ore in the form of a soluble complex, separating the leach liquor from the residue, introducing the leach liquor into the cathode compartment of an electrolytic cell in which electrolysis produces sodium hydroxide in the cathode compartment and sodium bicarbonate in the anode compartment, the electrolysis in the cell and the rate of introduction of the leach liquor being adjusted so that a pH is produced in the cathode compartment sufficiently high to decompose the soluble uranium complex and effect precipitation, as a sodium uranate, of a portion of the uranium, separating the precipitated sodium uranate from a mother liquor containing a portion of the uranium in solution, mixing the mother liquor with the anolyte at a rate sufficient to regenerate a leach liquor having the desired sodium bicarbonate content, adding makeup sodium carbonate to compensate for losses of sodium in the precipitation step and reusing the regenerated leach liquor.

4. A process according to claim 3 in which the leaching step is conducted at elevated temperature under evaporating conditions, the separation of leach liquor from residue is by filtration, the precipitate is washed, the separation of the sodium uranate precipitate from the catholyte is effected by filtration, the precipitate is washed and the water losses in the leaching step and in the operation of the electrolytic cell are sufficiently great to maintain the leach liquor volume.

5. A process according to claim 3 in which the leaching is effected with a leach liquor containing an oxidizing agent a portion of which is reduced in the leaching operation, the reduced product of the oxidizing agent being soluble under the conditions obtaining in the catholyte and the reduced oxidizing agent in the filtrate from the sodium uranate precipitation and recovery step is reoxidized in the anode compartment of the electrolytic cell.

References Cited in the file of this patent

UNITED STATES PATENTS

| | | |
|---|---|---|
| 808,839 | Haynes et al. | Jan. 2, 1906 |
| 2,219,342 | Stewart | Oct. 29, 1940 |

OTHER REFERENCES

Bachelet et al.: Bulletin de la Societe Chimique de France, Jan.–Feb. 1952, pages 55–60.